United States Patent [19]
Herb et al.
[11] Patent Number: 4,471,888
[45] Date of Patent: Sep. 18, 1984

[54] DEVICE FOR DISPENSING MEASURED AMOUNTS OF MULTI-COMPONENT MATERIALS

[75] Inventors: Armin Herb, Peissenberg; Erich Leibhard; Heinz Gruenewald, both of Munich, all of Fed. Rep. of Germany

[73] Assignee: Hilti Aktiengesellschaft, Schaan, Liechtenstein

[21] Appl. No.: 398,317

[22] Filed: Jul. 15, 1982

[30] Foreign Application Priority Data

Jul. 20, 1981 [DE] Fed. Rep. of Germany ....... 3128611

[51] Int. Cl.$^{3}$ ............................................ G01F 11/00

[52] U.S. Cl. .................................. 222/137; 222/145; 222/391; 74/128; 74/169

[58] Field of Search ............................... 222/135-137, 222/145, 325, 326, 327, 391; 74/128, 141.5, 160, 169

[56] References Cited

U.S. PATENT DOCUMENTS 2,349,005 5/1944 Roe ............................ 222/135 UX
3,117,696 1/1964 Herman et al. ................ 222/145 X
3,311,265 3/1967 Creighton, Jr. et al. ....... 222/391 X
3,390,814 7/1968 Creighton, Jr. et al. .......... 222/137
4,046,288 9/1977 Bergman ........................... 222/135

*Primary Examiner*—Charles A. Marmor
*Assistant Examiner*—Kevin P. Shaver
*Attorney, Agent, or Firm*—Toren, McGeady and Stanger

[57] ABSTRACT

A manually operable device is provided for dispensing measured amounts of a mastic-like or paste-like multi-component material. The components are supplied in separate containers and each container has an axially displaceable ejection piston. The pistons are displaced by piston rods and each piston rod can be gripped by a clamping jaw and the jaw is displaced via a manually operated lever and a stirrup. A support bearing member affords lateral support for the piston rods and the clamping jaws are pivotally mounted on the bearing member. The drive for the piston rods acts through the clamping jaw and the support bearing member so that each rod is displaced axially and does not need to be connected to the other. Due to a symmetrical arrangement of the forces acting on the support bearing member, the forces cancel one another out.

14 Claims, 4 Drawing Figures

DEVICE FOR DISPENSING MEASURED AMOUNTS OF MULTI-COMPONENT MATERIALS

SUMMARY OF THE INVENTION

The present invention is directed to a manually operable hand-held device for dispensing measured amounts of mastic-like or paste-like multi-component adhesive, sealing, filling, or putty material with the components arranged in at least two separate containers with an ejection piston located in each container and axially displaceable through the container by a piston rod and a pressing member secured to the end of the piston rod. Further, a drive axially displaces the piston rods and the drive is actuated by a manually operated lever.

In known devices of the above-described type, when the manually operated lever is actuated, the drive is engaged with the piston rod by a spring-like connection including a driver. After the manually operated lever connects the driver to the piston rod, during further movement of the lever the piston rod is axially displaced and a certain quantity of the material is forced out of the container by the ejection piston. After the lever is released, the driver is separated from the piston rod and returned to its original position by a spring force. Such an arrangement has proved useful in devices where a single component material is being dispensed.

In devices for dispensing multi-component materials several ejection pistons must be actuated simultaneously. It is known to connect separate piston rods together using a web. The driver is then connected to one of the piston rods or to a common piston rod connected to the web. This second solution has the disadvantage that the device has a large overall length. If the drive acts on only one of the piston rods, then the driving forces must be transmitted via webs from the one piston rod to the others. Such driving forces can be very considerable when particularly viscous materials are being dispensed. Since the drive forces act eccentrically on the other piston rods, these forces tend to cause bending of the piston rods. Furthermore, there is considerable stressing on the piston rod supports and, in turn, such stressing leads to considerable friction losses. In an unfavorable arrangement, the piston rod can become jammed in their guides.

Therefore, the primary object of the present invention is to provide a device for the measured dispensing of multi-component materials using a drive with high efficiency and limited susceptibility to problems.

In accordance with the present invention, the drive has a driver or carrier which acts on each piston rod. As a result, connecting webs extending between the individual piston rods are unnecessary. The piston rods can be connected to one another to provide a common retraction or withdrawal movement. When the piston rods are driven for dispensing the material, the webs do not have to transmit any forces and thus can be formed in a light weight manner.

To avoid any idling stroke, it is advantageous if the driver is brought directly into engagement with the piston rod in any possible position of the rod. Accordingly, it is advisable to form the driver or carrier as an axially displaceable clamping or gripping jaw which is pressed radially against the piston rod when the manually operated lever is actuated. To avoid deforming the surface of the piston rod, the clamping jaw can be adapted to the cross-sectional shape of the piston rod.

Driving forces transmitted from the driver or carrier to the piston rod can be very great. Therefore, in certain cases it is advisable that the carrier is formed as an axially displaceable pawl engageable in notches or teeth on the piston rod when the manually operated lever is actuated. In such an arrangement the pawl moves into positive locking engagement with the piston rod. The notches on the piston rod can be provided with a saw-tooth-like shape so that after the drive is released, the pawl can slide over the notches. The spacing between the notches or teeth can be selected very small. Consequently, there is practically no idling stroke performed in effecting the engagement of the pawl in the next notch.

In particular, when a clamping jaw is pressed radially against the piston rod, but also when a pawl is used, forces directed transversely of the longitudinal axis of the piston rod arise during the driving operation. To assure that such forces are not absorbed by the piston rod guides so that additional friction forces are not developed, it is advisable to combine an axially displaceable support bearing member along with the driver or carrier so that the piston rod is held between the bearing member and the driver. Such a support bearing member also prevents significant deformation of the piston rods. During the driving operation, the support bearing member is axially displaced with the driver in axially moving the piston rod. Further, the support bearing member can be shaped, at least in part, to conform to the transverse cross-sectional shape of the piston rod.

To ensure that the support bearing member is axially displaced along with the driver, it is advantageous to pivotally mount the driver on the bearing member. With such an arrangement, longitudinal or axial guiding is necessary only for the support bearing member.

When the piston rod is pressed against the support bearing member by the driver, forces directed transversely of the axial feed direction are developed on the bearing member. These forces tend to cause friction in the longitudinal guides for the support bearing member. To avoid or at least reduce such friction, it is advisable to form the support bearing member as a unitary element. In a symmetrical arrangement of the piston rods and the driver, holding forces acting on the common support bearing member cancel one another out and produce only an internal stress in the support bearing member.

In principle, dispensing multi-component materials is possible in the device embodying the present invention. With regard to handling and application of the materials, in practice such a device has been noticeably successful for dispensing two-component materials. In one material, one component is a resin and the other component is a hardener. Both components can include filler materials. Therefore, it is advantageous in a device for dispensing two-component materials to provide two piston rods with a driver for each rod. Through a symmetrical arrangement of the piston rods and drivers, identical parts can, to some extent, be employed.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figures 1, 2, 3, 4:
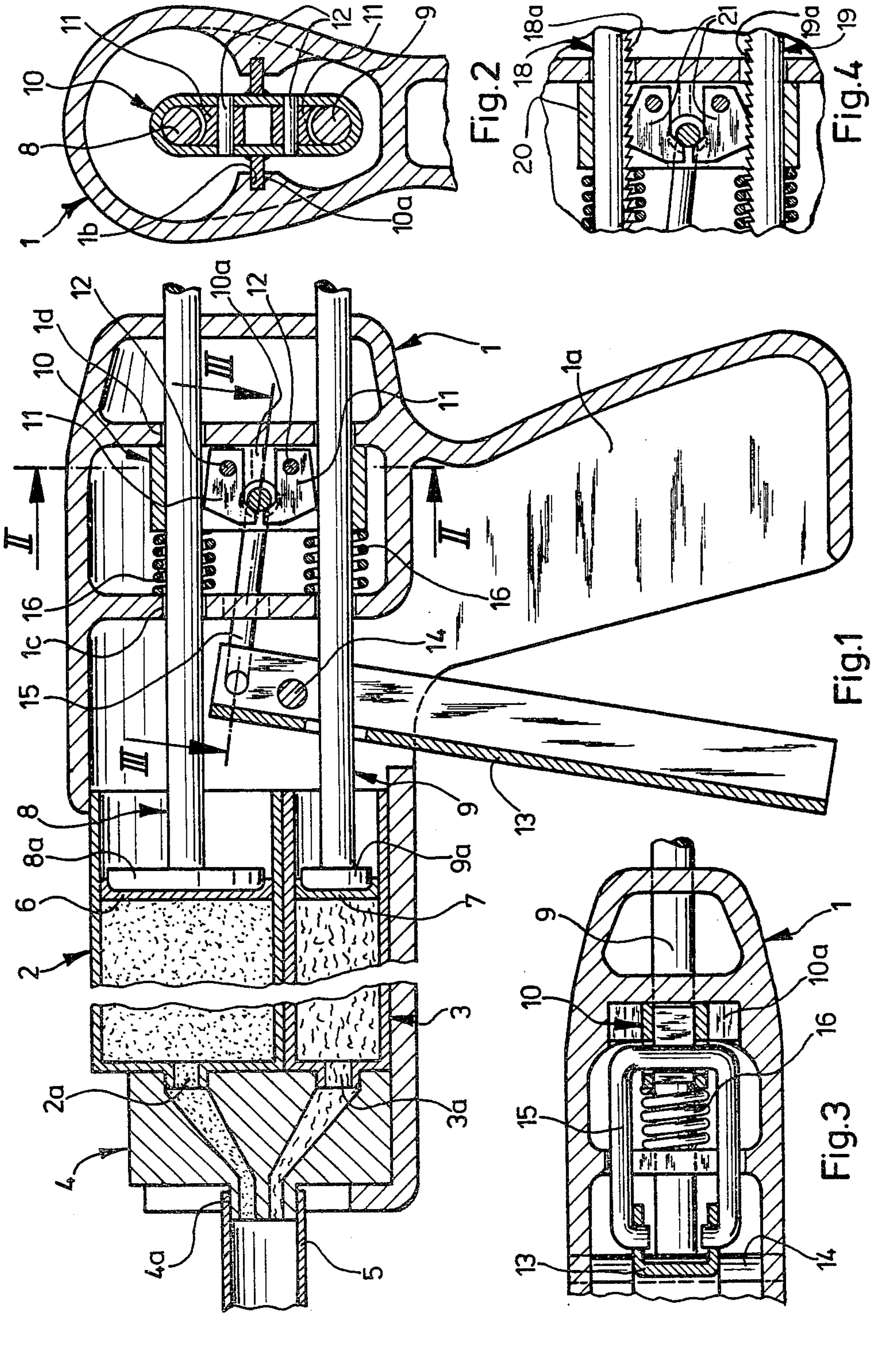
FIG. 1 is an axially extending sectional view of a device embodying the present invention.
FIG. 2 is a cross-sectional view taken along the line II—II in FIG. 1.
FIG. 3 is a sectional view taken along the line III—III in FIG. 1.
FIG. 4 is a partial sectional view, similar to that shown in FIG. 1, of another embodiment of the device incorporating the present invention.

In FIGS. 1–3 a multi-component dispensing device is shown including a housing 1 capable of being hand-held. A handle 1*a* is connected to the housing 1. Two containers 2, 3 are mounted in the forward portion of the housing 1 and each container holds a separate component of a material to be dispensed. As viewed in FIG. 1, the forward or front end of the housing from which the material is dispensed, is the left hand end. Each of the containers 2, 3 has a discharge opening 2*a*, 3*a*, directed into a common outlet member 4. The separate components pass through the outlet member 4, flowing in the forward direction, and enter into a replaceable mixing chamber 5 mounted on an annular shoulder 4*a* on the forward side of the outlet member 4. Each of the containers 2, 3, has an ejection piston 6, 7. These pistons fit into the rear end of the containers 2, 3 and can be moved in the axial direction toward the forward or discharge openings 2*a*, 3*a*, each by a piston rod 8, 9. A pressing member 8*a*, 9*a* is located on each of the piston rods 8, 9 and in surface contact with the ejection pistons 6,7. By means of the pressing members 8*a*, 9*a*, the piston rods 8, 9 displace the pistons 6, 7 through the containers 2, 3 for discharging the individual components from within the containers. Within the housing 1, rearwardly of the rear ends of the containers 2, 3, there is a unitary support bearing member 10 which laterally encloses an axially extending portion of the piston rods 8, 9. A pair of clamping jaws 11 are located opposite one another within the support bearing member 10 and each is pivotally mounted about a separate pin 12 supported on the bearing member. A manually operable lever 13 is rotatably supported in the housing 1 so that it can be pivoted about an axle 14. As can be seen in FIG. 3, in cross-section, the lever 13 is U-shaped with the legs of the U-shaped member projecting rearwardly from the bight portion interconnecting the legs. A C-shaped stirrup 15 is located within the housing and is connected at its free ends into the opposite legs of the lever 13 above the axle 14. Rearwardly from the lever 13, the stirrup is in engagement with the clamping jaws 11. When the manually operable lever 13 is gripped and pivoted about the axle 14 its upper end moves counterclockwise about the pin 14, as viewed in FIG. 1, toward the front end of the housing. As a result, the stirrup 15 moves forwardly and presses the clamping jaws 11 radially relative to the axes of the piston rods 8,9. Each clamping jaw is pivoted about its pin 12 against the associated piston rod 8, 9 so that the piston rod is pressed into contact with the inside surface of the unitary support bearing member 10. As can be seen in FIG. 2, the support bearing member 10 has an oblong shape in section extending transversely of the axial direction of said piston rods. Accordingly, each of the piston rods is clamped between its associated clamping jaw 11 and the support bearing member 10. Initially, as the lever 13 is pivoted about its axle 14 the gripping action is effected by the combination of the clamping members 11 and the support bearing member 10. During further movement of the lever 13 in the counterclockwise direction about the axle 14, the gripping action holds the piston rods and moves them in the forward direction for dispensing measured amounts of the materials within the containers 2, 3. As a result, proportional amounts of the material to be dispensed are displaced out of the containers in accordance with the cross-sectional area of the containers. The displaced material flows through the outlet member 4 into the mixing chamber 5. When the manually operable lever 13 is released, the gripping action on the piston rods is also released and the abutment returns to its original position, as shown in FIG. 1, due to the biasing action of the springs 16. Further, the clamping jaws 11 slide rearwardly along the piston rods 8, 9 which remain in the position into which they were displaced by the driving action. When the lever is released the stirrup 15 also moves in the rearward direction back to its original position. Piston rods 8, 9 can be axially displaced independently of one another. To withdraw the piston rods 8, 9 as a unit in the rearward direction they can be connected together by a web, not shown. A detachable blocking mechanism, known per se and not shown, prevents any undesired rearward movement of the piston rods 8, 9 and such a blocking mechanism need only contact one of the piston rods.

As shown in the cross-sectional view of the device in FIG. 2, the support beating member 10 has laterally extending guide tabs 10*a* extending outwardly into grooves 1*b* in the housing with the grooves forming guides for the tabs. The guide grooves 1*b* and the tabs 10*a* fitting into them serve to guide the support bearing member 10 in its movement within the housing 1 in the axial direction of the piston rods 8, 9. With the clamping jaws 11 connected by the pins 12 to the support bearing member 10, the external forces acting on the support bearing member compensate one another so that the guiding surfaces absorb practically none of the forces acting transversely of the axial direction of the piston rods. Accordingly, friction losses are small.

To ensure the gripping action between the support bearing member 10 and the piston rods 8, 9, boreholes 1*c* and 1*d* are provided in the parts of the housing 1 through which the piston rods extend adjacent to the bearing member. The boreholes 1*c*, 1*d* are larger than the piston rods so that a certain amount of radial play is present. Accordingly, there is no interference by the housing as the piston rods 8, 9 are axially displaced toward the forward end of the housing.

In FIG. 4 another embodiment of the present invention is shown, however, only a small portion is displayed, illustrating the manner in which the piston rods 18, 19 are gripped. Each of the piston rods 18, 19 has notch or tooth-like grooves 18*a*, 19*a*. Instead of the clamping jaws 11 shown in the embodiment of FIGS. 1–3, a pawl 21 engages the grooves 18*a*, 19*a* in the piston rods in effecting the movement of the rods. Since transverse forces are relatively small because of the positive-locking engagement of the pawls 21 with the piston rods 18, 19, the piston rods do not have to be supported against the support bearing member 20. The remainder of the drive arrangement for axially displacing the piston rods is the same as that shown in FIGS. 1–3.

While specific embodiments of the invention have been shown and described in detail to illustrate the application of the inventive principles, it will be understood that the invention may be embodied otherwise without departing from such principles.

We claim:

1. A manually operable device for dispensing measured amounts of mastic-like or paste-like multi-component material held in two separate axially extending containers, comprising a housing for supporting the containers, an axially displaceable ejection piston is associated with each container and is displaceable into the container for forcing the material out of the container, a piston rod associated with each said piston and extending in the axial direction, each said piston rod having a first end and a second end, a pressing member positioned on the first end of each said piston rod and disposed in contact with said ejection piston associated with said piston rod for displacing said piston through the container and forcing the material out of the container, drive means within said housing for moving each of said piston rods in the axial direction for dispensing material out of the containers, a manually operable lever mounted on said housing for operating said drive means, wherein the improvement comprises that said drive means is movable in the dispensing direction and in the opposite direction, said drive means includes means for engaging and moving said piston rods for axially displacing said piston rods in the dispensing direction when material is to be dispensed out of the containers, and said drive means is releasably engageable with said piston rods so that when said drive means moves in the opposite direction it is released from said piston rods.

2. The manually operble device ass set forth in claim 1, wherein two said piston rods are located within said housing said means for engaging said piston rods includes a separate engaging member for each of said piston rods.

3. The manually operable device, as set forth in claim 1, wherein said means for engaging said piston rods comprises a clamping jaw for each said piston rod, each said clamping jaw is movable transversely of the axial direction of said piston rods into pressing contact with one of said piston rods when said manually operable lever is actuated, and said clamping jaw is axially displaceable in the dispensing direction in engagement with said piston rod for moving said piston rod axially.

4. The manually operable device, as set forth in claim 3, wherein said means for engaging said piston rods includes an axially displaceable support bearing member located on the side of each said piston rod opposite from each said clamping jaw so that each said piston rod is gripped and held between said support bearing member and one of said clamping jaws for axially displacing said piston rods.

5. The manually operable device, as set forth in claim 4, wherein each said clamping jaw is pivotally connected to said support bearing member.

6. The manually operable device, as set forth in claim 5, wherein said support bearing member is a unitary member and pivotally supports each of said clamping jaws.

7. The manually operable device, as set forth in claim 1, wherein said means for engaging said piston rods comprises a pawl for each said piston rod, said piston rods having tooth-like grooves formed in the surface thereof with each said pawl being engageable within said grooves in one of said piston rods, and said pawls being axially displaceable in the dispensing direction in engagement with said grooves when said manually operable lever is actuated for axially displacing said piston rods.

8. The manually operable device, as set forth in claim 7, wherein said means for engaging said piston rods includes an axially displaceable support bearing member located on the side of each said piston rod opposite from each said pawl so that each said piston rod is gripped and held between said support bearing member and one of said pawls for axially displacing said piston rods.

9. The manually operable device, as set forth in claim 8, wherein each said pawl is pivotally connected to said support bearing member.

10. The manually operable device, as set forth in claim 9, wherein said support bearing member is a unitary member and pivotally supports each of said pawls.

11. The manually operable device, as set forth in claim 1, wherein two said piston rods are axially displaceably positioned within said housing, said means for engaging said piston rods comprises a support bearing member laterally enclosing each of said piston rods for an axially extending portion thereof, a pair of gripping member each pivotally connected to said support bearing member and each displaceable transversely of the axial direction of said piston rods into contact with said piston rods so that each said gripping member in combination iwth said support bearing member grips one of said piston rods to that said piston rods can be moved axially within said housing.

12. The manually operable device, as set forth in claim 11, wherein said support bearing member has a guide tab extending laterally outwardly from each opposite side thereof, said housing having guide grooves therein facing toward said support bearing member with said tabs slidably guided within said grooves.

13. The manually operable device, as set forth in claim 12, including spring means extending from the end of said support bearing member facing in the direction in which the material is dispensed from the housing into contact engagement with said housing so that said spring means biases said support bearing member in the direction opposite to the direction in which said piston rods are displaced in dispensing material from said housing.

14. The manually operable device, as set forth in claim 13, including a stirrup attached to said manually operable lever and in contact with said gripping members for forcing said gripping members into contacting engagement with said piston rod when said manually operable lever is actuated so that the pivotal movement of said manually operable lever is transmitted through said stirrup to said gripping member and said support bearing member for moving said piston rods axially for dispensing material from the containers located in the housing.

* * * * *